(12) United States Patent
Kenoyer

(10) Patent No.: US 8,218,829 B2
(45) Date of Patent: Jul. 10, 2012

(54) SYSTEM AND METHOD FOR USING BIOMETRICS TECHNOLOGY IN CONFERENCING

(75) Inventor: Michael Kenoyer, Austin, TX (US)

(73) Assignee: Polycom, Inc., Pleasanton, CA (US)

( * ) Notice: Subject to any disclaimer, the term of this patent is extended or adjusted under 35 U.S.C. 154(b) by 1537 days.

(21) Appl. No.: 11/461,204

(22) Filed: Jul. 31, 2006

(65) Prior Publication Data

US 2006/0259755 A1    Nov. 16, 2006

Related U.S. Application Data

(63) Continuation of application No. 10/225,254, filed on Aug. 20, 2002, now abandoned.

(60) Provisional application No. 60/314,270, filed on Aug. 20, 2001.

(51) Int. Cl.
  *G06K 9/00*    (2006.01)
(52) U.S. Cl. ........ 382/118; 382/115; 382/117; 382/107; 382/181; 382/151; 382/109; 382/103; 382/106; 382/284; 382/276; 713/200; 705/1; 705/321
(58) Field of Classification Search .................. 382/118, 382/115, 117, 107, 181, 151, 109, 103, 106, 382/284, 276; 713/200; 705/1, 321
See application file for complete search history.

(56) References Cited

U.S. PATENT DOCUMENTS

| | | | |
|---|---|---|---|
| 5,530,472 A | 6/1996 | Bregman et al. | |
| 5,850,470 A | 12/1998 | Kung et al. | |
| 6,618,806 B1 | 9/2003 | Brown et al. | |
| 6,792,144 B1 * | 9/2004 | Yan et al. | 382/190 |
| 6,850,265 B1 * | 2/2005 | Strubbe et al. | 348/14.05 |
| 6,894,714 B2 * | 5/2005 | Gutta et al. | 348/14.07 |
| 6,940,545 B1 * | 9/2005 | Ray et al. | 348/222.1 |
| 2002/0064314 A1 * | 5/2002 | Comaniciu et al. | 382/239 |
| 2003/0090564 A1 * | 5/2003 | Strubbe | 348/14.01 |

* cited by examiner

*Primary Examiner* — Mike Rahmjoo
(74) *Attorney, Agent, or Firm* — Wong, Cabello, Lutsch, Rutherford & Brucculeri, L.L.P.

(57) ABSTRACT

A system and method are provided which utilize biometrics technology in a conference environment. A biometrics engine detects facial images of a user, generates biometrics of the detected facial images, and compares the generated biometrics with biometrics information of authorized users. If a match is found, then the user is authorized and is automatically logged into the conference network. Once logged in, conferences may be automatically established, the user may be tracked by at least one video sensor, user preferences may be automatically set, and/or conference content may be easily accessed and shared with remote conference participants.

14 Claims, 5 Drawing Sheets

SYSTEM AND METHOD FOR USING BIOMETRICS TECHNOLOGY IN CONFERENCING

CROSS-REFERENCE TO RELATED APPLICATION

This application is a continuation application of U.S. patent application Ser. No. 10/225,254, filed Aug. 20, 2002, which claims the benefit of Provisional Patent Application Ser. No. 60/314,270, filed on Aug. 20, 2001, which is herein incorporated by reference.

BACKGROUND

1. Field of the Invention

This invention relates generally to videoconferencing, and more particularly to a system and method for using biometrics technology in videoconferencing.

2. Description of Related Art

An essential element of the new global economy is a large number of business transactions occurring between participants in widely different geographic locations. Since it is often difficult and costly for all such participants to meet in a single location, many participants rely on conferencing mechanisms such as conference call services and videoconference systems. Advantageously, these videoconference systems allow participants to view and hear other participants, observe remote demonstrations, and exchange information. Videoconferencing thus allows people at two or more locations to collaborate.

Typically, a user who wishes to initiate a videoconference must first gain access to a communication resource, such as a videoconference network including a videoconference system. Conventionally, the user must manually input his or her network user name and password in order to gain access to the videoconference network. A major disadvantage of this access method is that an unauthorized person with a stolen password can access the videoconference network. Likewise, an authorized user who forgets his or her user name or password, or does not correctly enter the user name or password, cannot access the videoconference network.

Further, a typical videoconference system has characteristics that must be configured before the videoconference system can be used. Additionally for a communication network based on the Internet Protocol (IP), a videoconference system usually must have each remote terminal's IP address in order to establish communication with each remote terminal. Since a typical IP address contains four fields having three decimal digits each (e.g., 102.160.190.240), manually inputting an IP address into a computer or videoconference system is time consuming and prone to error. This problem is expected to worsen as future generations of IP addressing schemes may contain even more digits. Further, in more complicated networks having firewalls and network address translation steps, the videoconference system may require a great deal more configuration before the videoconference system can communicate with another videoconference system over such a communication network. Thus, even setting up a simple videoconference amongst a few people may be a time-consuming and frustrating process.

Another drawback to conventional videoconference systems is immobility. Traditionally, a speaker must remain stationary during a course of a videoconference since the camera is typically fixed in one direction. If the speaker moves around a conference room, the speaker risks moving, either partially or fully, out of a camera's field of view.

Once a videoconference is established, a number of other tasks may typically be performed. A presenter may have presentation material to provide to the other conference participants. Either this presentation material must be physically brought to the videoconference system and loaded, or the presenter must manually retrieve the presentation from a network storage resource. Each of these methods presents usage and security concerns. Further, the presenter in a videoconference may want to restrict access to certain presentation materials, or to provide different materials to different participants. Such access control is accomplished today by protecting each file with an appropriate password, or by transmitting certain files to appropriate individuals in advance. However, these access control methods are laborious, produce inconsistent results, and are apt to result in security breaches.

Further, many conveniences and features of videoconferencing require manual configuration. For instance, the user may prefer a certain screen format or display brightness, but may not know how to configure these settings on the videoconference system, or the user may not have the extra time needed to manually adjust these settings.

For all of the foregoing reasons and other related reasons, a videoconference user must manually execute complex and time consuming procedures to initiate and maintain a videoconference. Further, the user typically must remain stationary during the course of the videoconference. Therefore, there is a need for a system and method of videoconferencing that provides ease of use, enhanced security, and personalization features. There is a further need for a system and method using biometrics technology in a videoconferencing environment.

SUMMARY

The present invention generally comprises a system and method for authorizing, initializing, and conducting videoconferences using biometrics technology, such as facial image biometrics. In one embodiment, a videoconference system comprises a processing unit, at least one video sensor for capturing images of a user, a data storage device storing user identification information, and a biometrics engine for authenticating the user by comparing the captured image with the user identification information.

This biometrics engine further comprises a face detect module, a biometrics generation module, a face match module, and an optional face tracking module. The face detect module detects a facial image in the captured image of the user. The facial image is then forward to the biometrics generation module, which generates biometrics information for the facial image. Subsequently, the face match module takes the biometrics information for the facial image and compares the biometrics information with information for authorized users obtained from the data storage device. If a match is found, then the user is automatically logged into the videoconference network through the videoconference system.

In a further embodiment, the authorized user may be tracked during the videoconference. The face tracking module will instruct the at least one video sensor to following the authorized user. Thus, the authorized user is not restricted to remain in front of the at least one video sensor. Alternatively, the authorized user will remain a focal point of the at least one video sensor if the authorized user is in an environment with a plurality of individuals.

Once the user is logged into the videoconference network, a videoconference connection may be automatically established. First, the videoconference system will access a conference schedule database to determine if a videoconference is scheduled to occur soon or is in progress. If a videoconference is on the schedule, then the videoconference system will access a conference contact database in order to obtain information required to establish the conference connection, such as a phone number or IP address of remote videoconferencing systems. The videoconference is then established. In a further embodiment, the authorized user's preferences will be automatically set based on preferences stored in a user preference database.

Additionally, conference content, such as presentations or spreadsheets, may be shared between participants during the videoconference. The conference content may be preloaded onto the videoconference network or videoconference system and stored in a conference content database. Once a videoconference is established, the user can easily access the conference content and share the content with any or all connected remote videoconference systems.

DETAILED DESCRIPTION

The present invention generally comprises a system and method for authorizing, initializing, and conducting videoconferences using biometrics technology, such as facial recognition. A prototypical example of a videoconferencing architecture is illustrated in FIG. 1, and is used herein for describing and teaching embodiments of the present invention.

Figure 1:
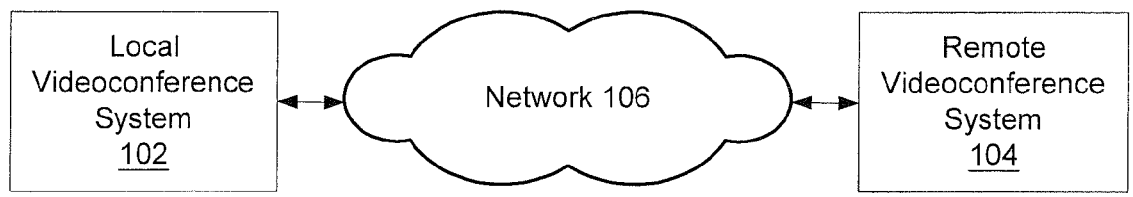
FIG. 1 is a block diagram of one embodiment of a videoconference environment.

FIG. 1 illustrates an exemplary videoconference environment 100. The videoconference environment 100 includes a local videoconference system 102 coupled to a remote videoconference system 104 through a communication network 106. Video and audio signals may be transmitted to and from the local and remote videoconference systems 102 and 104, respectively, via the communication network 106. The communication network 106 may be a local area network (LAN), a wide area network (WAN), the public switched telephone network (PSTN), a frame relay service, a combination of two or more of the above mentioned network types, or any other network type capable of supporting a videoconference. The local and remote videoconference system 102 and 104 may connect to the communication network 106 via the same technology or, alternatively, the local videoconference system 102 may connect to the communication network 106 using one technology while the remote videoconference system 104 connects using a different technology. For example, the local videoconference system 102 connects to the communication network 106 using an ISDN modem, while the remote videoconference system 104 connects using an Ethernet controller. Although FIG. 1 only shows two videoconference systems 102 and 104, those skilled in the art will recognize that more videoconference systems may be coupled to the videoconference environment 100.

Figure 2:
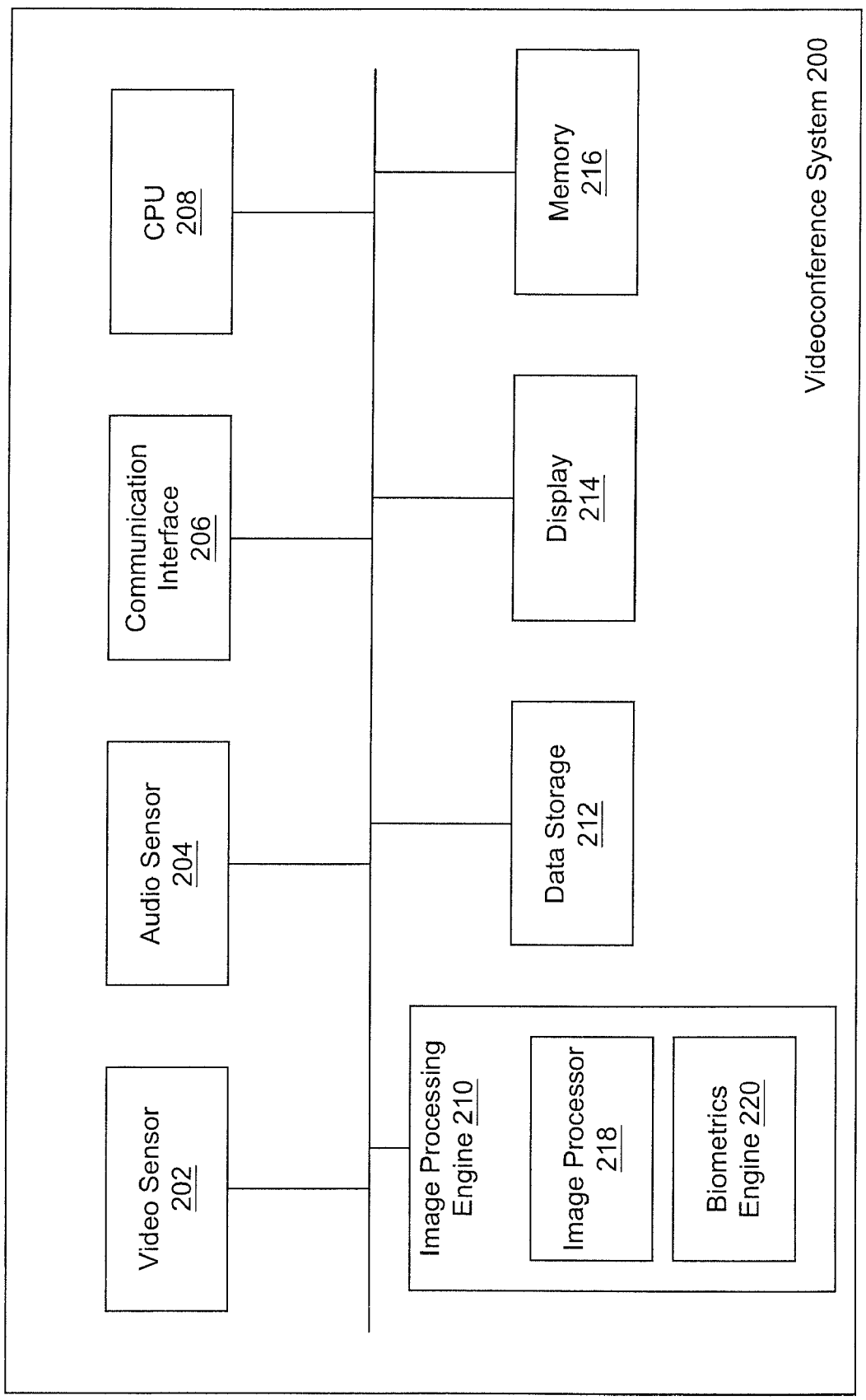
FIG. 2 is a block diagram of an exemplary videoconference system, according to the present invention.

Referring now to FIG. 2, components of an exemplary videoconference system 200 that may function as the local videoconference system 102 of FIG. 1 is illustrated. The videoconference system 200 includes at least one video sensor 202, at least one audio sensor 204, a communication interface 206, a central processing unit (CPU) 208, an image processing engine 210, data storage 212, a display 214, and memory 216. The image processing engine 210 further includes an image processor 218 and a biometrics engine 220, which will be discussed in more detail in connection with FIG. 4 below.

During a videoconference, the videoconference system 200 uses the at least one video sensor 202 (e.g., a video camera) to capture live video images, and uses the at least one audio sensor (e.g., a microphone) to capture audio of local videoconference participants. The captured images are then forwarded to the image processor 218 where the captured images are processed into video signals. Further, the image processor 218 may compress the signals for transmission to remote videoconference systems. Processed video signals may also be sent to the local display 214 for viewing. In an alternative embodiment, the videoconference system 200 may be practiced using recorded images, which would eliminate the need for the video sensor 202.

The processed video image signals along with the audio signals are then forwarded to the communication interface 206, which transmits the video and audio signals to the remote videoconference system 104 (FIG. 1) by way of the communication network 106 (FIG. 1). Local videoconference participants can thus communicate both visually and audibly with participants at the remote videoconference system 104. Because the videoconference system 200 operates bi-directionally, remote participants using a similar videoconference system similar to the videoconference system 200 can likewise transmit video and audio signals to local participants. In this way, meetings between parties who are separated over large distances can take place in real time.

Figure 3:
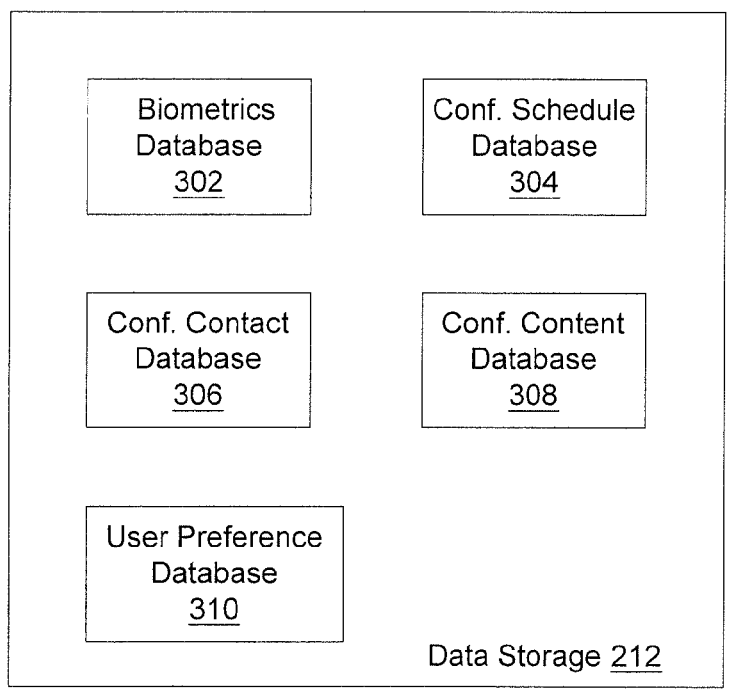
FIG. 3 is an exemplary block diagram of the data storage device of FIG. 2.

In the videoconference system 200 utilizing biometrics technology, the data storage 212 contains databases accessed by the videoconference system 200 for facilitating the videoconference. Referring now to FIG. 3, an exemplary data storage 212 is shown. The exemplary data storage 212 includes a biometrics database 302, which is accessed by the biometrics engine 220 (FIG. 2). The biometrics database 302 includes facial image data, facial structure data, or other physical and even behavioral characteristic data of authorized users. This data will be used by the biometrics engine 220 for identifying and authenticating authorized users of the videoconference system, as will be described in more detail in connection with FIG. 4.

Optionally, the data storage 212 may also comprise a conference schedule database 304, a user contact database 306, a user content database 308, and a user preference database 310. Thus, the data storage 212 may contain conference schedules for identifying a conference to initiate which is stored in the conference schedule database 304; user contact information, such as IP addresses and phone numbers, stored in the conference contact database 306; personal information for sharing in a conference such as presentations, scanned business cards, documents, spreadsheets, buddy lists, etc, stored in the conference content database 308; and personal preference settings for the videoconference system 200 stored in the user preference database 310. The conference content data may be preloaded into the conference content database 308 prior to the conference. Alternatively, the content data may be accessed from a remote location by the videoconference system 200. In one embodiment, because the user is now logged into the videoconference network, only the user's content data will be available for sharing during the videoconference. In a further embodiment, a list of content data may appear on the user's display, and the user merely needs to select from the list in order to share the data with remote users. Further, the content data may be restricted to certain remote participants by security measures. These security measures may be predefined prior to or during the conference to restrict such access. Finally, other information such as call control policies, network parameters, etc. may be provided in the data storage 212.

Alternatively, not all of these optional databases may be contained within the data storage 212, or other databases separate from the videoconference system 200 may be provided. For example, the conference content data may be stored on a storage device separate from the videoconference system 200 on a network or server device. Further, although FIG. 3 illustrates a separate database for each type of information, a single database may contain more than one type of information. For example1 a particular database may contain both the conference schedule and the user content information. Those skilled in the art will also recognize that other forms of data may be provided to the videoconference system 200.

Examples of data storage 212 include random access memory, read only memory, cache memory, hard disks, etc. Furthermore, the data storage 212 is not necessarily located in the videoconference system 200 (FIG. 2). Alternatively, the data storage 212 can be located on a remote server or a remote computer with the videoconference system 200 accessing data stored on the data storage 212 through a direct or network connection such as a LAN connection.

Figure 4:
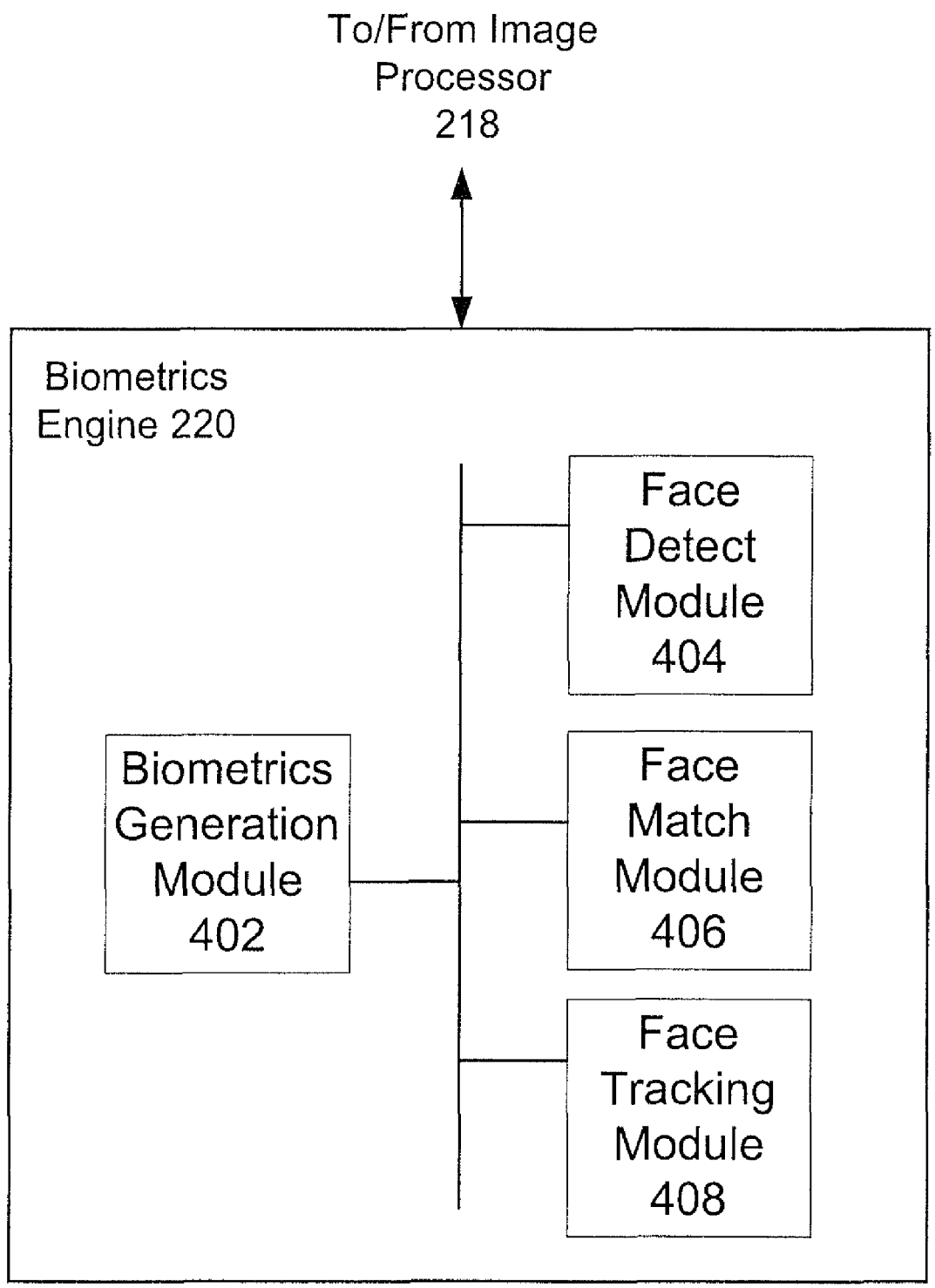
FIG. 4 is an exemplary block diagram of the biometrics engine of FIG. 2.

Referring now to FIG. 4, an exemplary biometrics engine 220 is shown. The biometrics engine includes a set of facial recognition modules which allows the videoconference system 200 (FIG. 2) to detect, match, and recognize faces. The biometrics engine includes a set of facial recognition modules which allows the videoconference system 200 (FIG. 2) to detect, match, and recognize faces. The biometrics engine 220 automatically detects human presence, locates and tracks faces, extracts facial images, generates current user biometrics, and performs identification by matching the current user biometrics against data stored in the biometrics database 302 (FIG. 3). The set of modules include a biometrics generation module 402, a face detect module 404, a face match module 406, and a face tracking module 408.

In one embodiment of the present invention, the face detect module 404 receives video images from the image processor 210. If the face detect module 404 detects a facial image, then the face detect module 404 sends the detected facial image to the biometrics generation module 402. The face detect module may detect the facial image from a shape of the face, through skin color, or other distinguishing characteristics. Subsequently, the biometrics generation module generates biometrics for the current user from the captured facial image. Then, the face match module 406 compares the generated current user biometrics received from the biometrics generation module 402 to user biometrics retrieved from the biometrics database 302. If a match is discovered, then the current user is authorized to access and logged into the videoconference network.

In a further embodiment, once a match is made, the authorized user's conference schedule 304 (FIG. 3) and conference contact database 306 (FIG. 3) are accessed. As a result, the videoconference system 200 may automatically initiate a videoconference with one or more participants identified in the conference schedule and user contact databases 304 and 306, respectively. Additionally, the authorized user s preferences may be automatically set based on information stored in the user preference database 310 (FIG. 3).

In one exemplary embodiment of the present invention, the biometrics engine 220 only performs user authorization at the beginning of a videoconference. However, alternative embodiments may periodically or continually monitor the captured image to insure that only authorized users are allowed access during the videoconference.

Optionally, the face tracking module 408 generates control information for controlling movement and focus of the at least one video sensor 202 (FIG. 2). Once a match is made between the generated current user biometrics with an authorized user biometrics stored in the biometrics database 302, the face tracking module 408 instructs the at least one video sensor to follow the authorized user. For example, the authorized user may be a teacher located at a front of a classroom. The teacher may shift from a location behind a podium to a display on a countertop for a demonstration. The at least one video sensor 202 will follow the teacher as he or she moves from the podium to the display. Further, the face tracking module 408 may instruct the at least one video sensor 202 to zoom in on the teacher or to zoom away from.

In another exemplary embodiment, the local videoconference system 102 may use biometrics authentication for authorizing inbound videoconference requests over the network 106 from the remote videoconference system 104. In such an instance, the local videoconference system 102 (FIG. 1) is configured to perform biometrics recognition of a facial image received from the remote videoconference system 104. The local videoconference system 102 may start to receive a video stream from the remote videoconference system 104, and forward images from the video stream to the biometrics engine 212. If the face detect module 404 detects a facial image, then the detected facial image is sent to the biometrics generation module 402, which generates remote user biometrics from the captured facial image. Subsequently, the face match module 406 compares the generated remote user biometrics received from the biometrics generation module 402 to user biometrics retrieved from the biometrics database 302.

Subsequently, if a match is made, the request will be granted. In one embodiment, the local videoconference system searches calendar information for a scheduled videoconference in which the identified remote user is scheduled to participate. Here, the search process preferably starts with all videoconferences scheduled to begin near the time that the inbound conference request was received, and proves to be valuable for efficiently initiating videoconferences between frequent videoconference participants who do not maintain calendars on the conference schedule database 304. Furthermore, specific preferences or policies associated with the identified remote user may be implemented once the remote user is identified. Further, a name tag or label may be displayed near the identified remote user to help a local user visually identify the remote user. The name tag is useful in a videoconference with a plurality of remote videoconference participants.

The biometrics engine 220 may use various methods, such as Eigenfaces, Linear Discriminant Analysis, Bayesian Intrapersonal/Extrapersonal Classifier, Gabor Filter Graph Matching Algorithm, etc., to detect, match, and recognize faces. Additionally, the biometrics engine 220 can be embedded on a chip or stored in the data storage 212.

Figure 5:
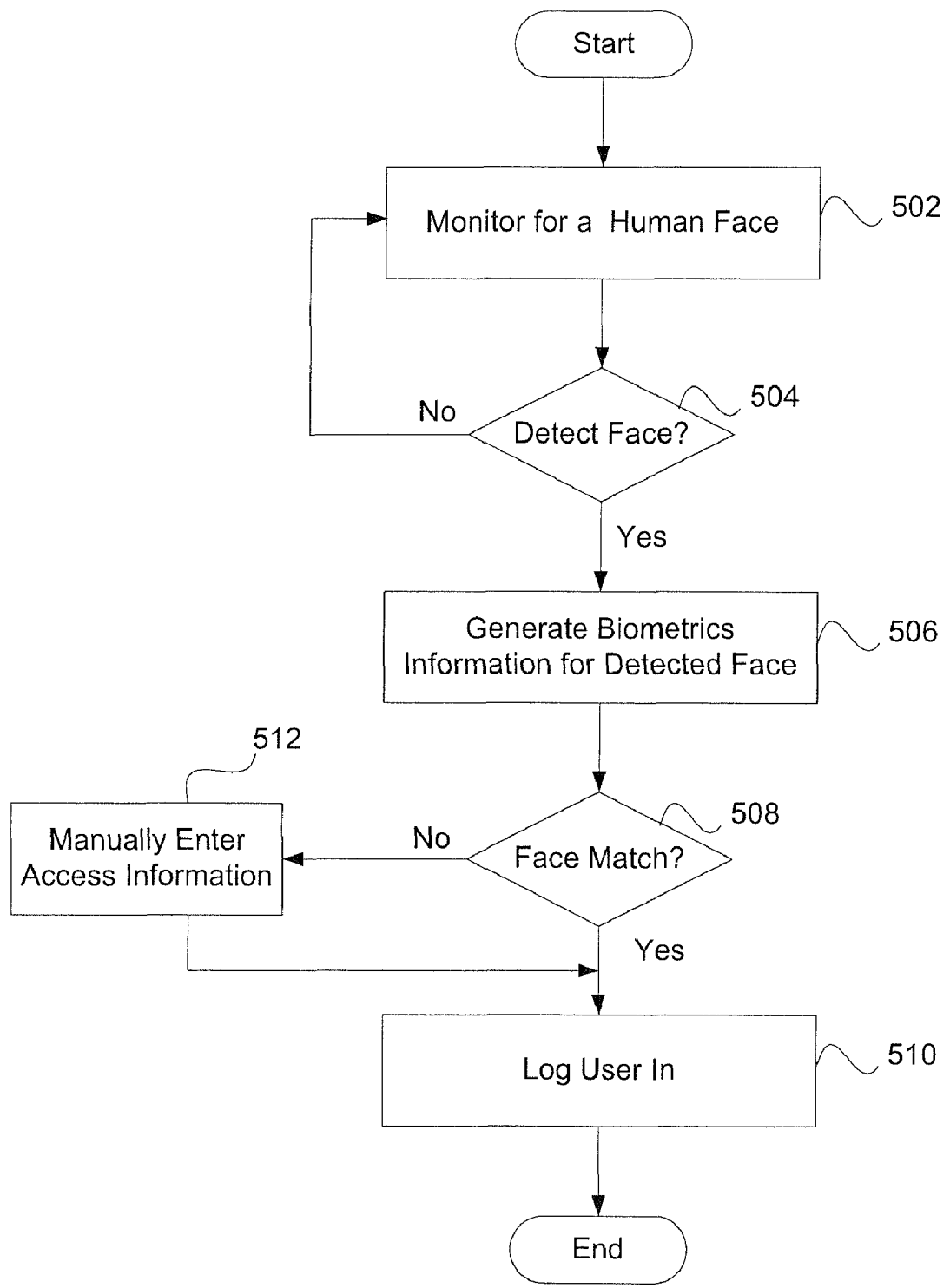
FIG. 5 is an exemplary flowchart of a method for initializing a videoconference using biometrics technology.
Figure 6:
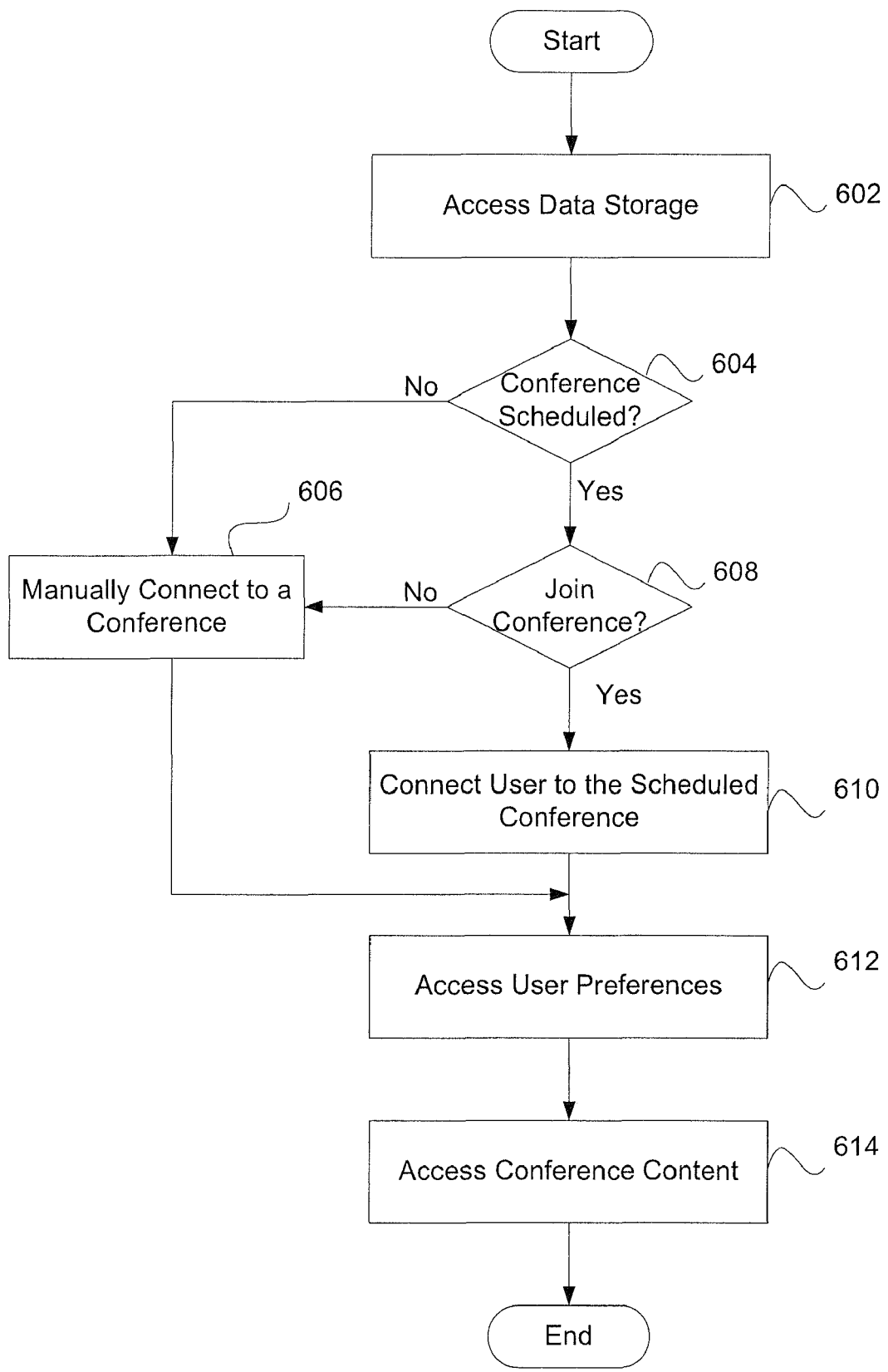
FIG. 6 is an exemplary flowchart of a method for conducting a videoconference using biometrics technology.

The following flowcharts of FIGS. 5 and 6 illustrate exemplary methods of operation for various embodiments of the present invention. To enhance clarity, these flowcharts illustrate some steps, and omit steps that would be apparent to one of ordinary skill in the art. Therefore, these flowcharts should not be inferred to require all the steps illustrated or to exclude a step not illustrated. Also, the order of many of the steps presented is not a required order, as many steps are independent of other steps.

FIG. 5 shows an exemplary method for initiating a videoconference with biometrics technology at the videoconference system 200 (FIG. 2), as an example. In block 502, the face detect module 404 (FIG. 4) monitors for a human face within a field of view of the at least one video sensor 202 until a face is detected. Once the face is detected in block 504, the videoconference system 200 may capture and store the image of the current face into memory 216 (FIG. 2) or the data storage 212 (FIG. 2). Additionally, the face detect module 404 forwards the detected facial image to the biometrics generation module 402. In block 506, the biometrics generation module 402 generates user biometrics information from the detected facial image.

Subsequently, in block 508, the face match module 406 (FIG. 4) accesses the biometrics database 302 (FIG. 3) of the data storage 212 for biometrics information of authorized user faces. The face match module 406 then attempts to identify the current captured facial image by matching the current face with the authorized user faces. If the face match module 406 finds a match between the current captured facial image and an authorized user face from the biometrics database 302, the current user is automatically logged into the videoconference network in block 510. However, if no match is found, then the user is denied access to the videoconference network, and subsequently must manually log into the videoconference network in block 512.

In one embodiment of the present invention, the current user which manual logs into the videoconference network may be allowed to register with the videoconference network through the videoconference system 200. Because the current user's facial images is already captured by the face detect module 402 and corresponding biometrics information has been generated by the biometrics generation module 402, the videoconference system 200 only needs to save the biometrics information into the biometrics database 302. Subsequently, the current user will be registered with the videoconference network, and will no longer need to manually log in.

A major advantage of the automatic identification and authentication feature of biometrics recognition technology is enhanced security. Authentication based on unique physical features of a person strengthens security. Additionally, the user can be continuously authenticated ensuring that at all times, the user in front of the videoconference system 200 continues to be the same authenticated user.

Referring now to FIG. 6, an exemplary method for conducting a videoconference using biometrics technology once the current user is logged into the videoconference network is shown. In block 602, the videoconference system 200 (FIG. 2) accesses the conference schedule database 304 (FIG. 3) of the data storage 212 (FIG. 2). The videoconference system 200 next determines in block 604, based on information from the conference schedule database 304, whether the user has a future videoconference meeting scheduled or whether a scheduled videoconference meeting is currently in progress. If no videoconference meeting appears on the conference schedule database 304, then the user must manually setup, and connect to, a videoconference in block 606. Manual connection to a videoconference typically requires the user to manually enter a videoconference phone number or IP address.

Alternatively, if a videoconference meeting is scheduled, the videoconference system 200 will ask the user whether the user wants to initiate the videoconference meeting or to join the videoconference meeting in progress in block 608. If the user decides not to join the scheduled videoconference, then the user must manually set up, and connect to, an alternative videoconference in block 606. However, if the user desires to join the scheduled videoconference, then the videoconference system 200 connects the user to the scheduled videoconference meeting by automatically dialing a predetermined or stored phone number or inputting a predetermined or stored IP address for a remote videoconference site based on information retrieved from the conference contact database 306 (FIG. 3) in block 610. In an alternative embodiment, the videoconference system 200 automatically connects the user to a scheduled videoconference meeting without user input (i.e., block 608 does not exist).

In block 612, the videoconference system 200 accesses the user preference database 310 (FIG. 3) of the data storage 212 in order to automatically adjust videoconference preferences based on retrieved personal preferences of the user. Examples of personal preferences include brightness and contrast of the video display 214 (FIG. 2), volume of speakers and microphones, view size, etc. In an alternative embodiment, the user preferences may be automatically adjusted at any time, such as immediately after the user is logged into the videoconference system 200.

Once the videoconference has begun, the videoconference system 200 automatically makes accessible to the user any data stored on the conference content database 308 (FIG. 3) in block 614. Subsequently, the user can specify which data to transfer or display at the remote videoconference site. For example, the user may have a presentation preloaded into the conference content database 308. During the videoconference, the user selects the presentation and the presentation is displayed on the user's display 214 and a display of the remote videoconference site.

With biometrics technology, the videoconference system 200 can also automatically have the at least one video sensor 202 (FIG. 2) follow and focus on the user. Additionally, in a complex scene with multiple faces, the videoconference system 200 can recognize and follow a particular user. As a result, the particular user will not have to remain stationary during the videoconference meeting.

Finally, a local videoconference system 102 (FIG. 1) can identify and recognize participants of remote videoconference systems 104 (FIG. 1) if facial images and identity information of the participants at the remote videoconference systems 104 are stored in the biometrics database 312 (FIG. 3). As a result, the local videoconference system 102 can automatically place a name tag near each remote participant on the video display 214 to help a local user visually identify each remote participant. Additionally, the local videoconference system 102 can display or print any authorized data stored on the network or sent from the remote videoconference system 104.

This method may be extended to audio conferences as well. Sometimes, a user chooses to participate via audio only, rather than both audio and video, to conserve bandwidth over a low bandwidth connection. However, the user may still have a facility to send or receive a video or still image of a facial image for biometrics recognition. The systems and methods described above can be configured to accommodate this situation as well.

As exemplary embodiments of the present invention are described above with reference to the aforementioned figures, various modifications or adaptations of the methods and/or specific structures described may become apparent to those skilled in the art. For example, biometrics technology other than facial recognition may be used. All such modifications, adaptations, or variations that rely upon the teachings of the present invention, and through which these teachings have advanced the art, are considered to be within the spirit and scope of the present invention. Hence, these descriptions and figures are not to be considered in a limiting sense as is understood that the present invention is in no way limited to the embodiments illustrated.

What is claimed is:

1. A video conferencing system comprising:
    at least one video sensor that captures live video images of local video conference participants;
    an image processing engine connected to receive video images from the at least one video sensor and produce processed images, the image processing engine including an image processor and a biometrics engine; and
    a communication interface connected to receive the processed images and coupled to a communication network to enable transmission of the processed images over the communication network; and
    wherein the biometrics engine detects and recognizes faces of one or more local video conference participants and causes the video conferencing system to set one or more video conference preferences automatically based on the one or more recognized local participants.

2. The video conferencing system of claim 1 wherein the biometrics engine detects and recognizes faces of one or more remote video conference participants in video images received from a remote video conference system via the communication network through the communication interface.

3. The video conferencing system of claim 2 wherein the biometrics engine sets one or more video conference preferences automatically based on the recognized one or more remote video conference participants.

4. The video conferencing system of claim 2 wherein the biometrics engine displays a name label near the recognized one or more remote video conference participants.

5. The video conferencing system of claim 4 wherein the biometrics engine controls movement and focus of the at least one video sensor to track a recognized face.

6. The videoconferencing system of claim 2 wherein the biometrics engine controls movement and focus of the at least one video sensor to track a recognized face.

7. The video conferencing system of claim 1 wherein the biometrics engine causes the video conferencing system to access at least one of a conference schedule and a contacts database corresponding to a recognized local participant.

8. The videoconferencing system of claim 7 wherein the biometrics engine automatically initiates a video conference identified in the conference schedule corresponding to the recognized local participant.

9. The videoconferencing system of claim 7 wherein the biometrics engine automatically initiates a video conference identified in the conference schedule with one or more participants identified in the user contact database.

10. The videoconferencing system of claim 7 wherein the biometrics engine controls movement and focus of the at least one video sensor to track a recognized face.

11. The videoconferencing system of claim 7 wherein the biometrics engine controls movement and focus of the at least one video sensor to track a recognized face.

12. A video conferencing system comprising:
    at least one video sensor that captures live video images of local video conference participants;
    an image processing engine connected to receive video images from the at least one video sensor and produce processed images, the image processing engine including an image processor and a biometrics engine;
    a communication interface connected to receive the processed images and coupled to a communication network to enable transmission of the processed images over the communication network; and
    wherein the biometrics engine detects and recognizes faces of one or more remote video conference participants in video images received from a remote video conference system via the communication network through the communication interface and sets video conference preferences automatically based on the recognized one or more remote video conference participants.

13. The videoconferencing system of claim 12 wherein the video conferencing system displays a name label near the recognized one or more remote video conference participants.

14. The videoconferencing system of claim 12 wherein the video conferencing system displays a name label near the recognized one or more remote video conference participants.

* * * * *